United States Patent [19]

Jones

[11] Patent Number: 5,149,056

[45] Date of Patent: Sep. 22, 1992

[54] WIRE PULLER FOR ELECTRICAL CONDUITS

[76] Inventor: Brian E. Jones, 8910 Roanoke Pl., NE., Bremerton, Wash. 98310

[21] Appl. No.: 721,883

[22] Filed: Jun. 27, 1991

[51] Int. Cl.⁵ .............................................. E21C 29/16
[52] U.S. Cl. .................................................. 254/134.3 FT
[58] Field of Search ............... 254/134.3 FT, 134.3 R, 254/213, 266, 362; 242/96; 15/104.33; 226/143

[56] References Cited

U.S. PATENT DOCUMENTS

| | | | |
|---|---|---|---|
| 2,861,330 | 11/1958 | Kratz | 29/275 |
| 3,208,134 | 9/1965 | Krewson | 29/275 |
| 3,209,445 | 10/1965 | Moskovitz | 29/275 |
| 3,279,044 | 10/1966 | Roper | 29/254 |
| 3,968,952 | 7/1976 | Newell | 254/134.3 R |
| 4,196,864 | 4/1980 | Cole . | |
| 4,229,870 | 10/1980 | Tate | 29/254 |
| 4,270,734 | 6/1981 | Straight . | |
| 4,432,125 | 2/1984 | Monteleone et al. | 29/255 |
| 4,926,537 | 5/1990 | Pool | 29/275 |
| 4,951,890 | 8/1990 | Sossamon . | |
| 4,956,889 | 9/1990 | Kirk | 254/134.3 FT |

*Primary Examiner*—Robert C. Watson
*Attorney, Agent, or Firm*—Richard C. Litman

[57] ABSTRACT

A string puller for drawing electrical wires through conduits consists of a ⅜ inch rod with a short ¼ inch extension at one end. A washer is loosely held between the rod and extension. The rod is placed in the chuck of an electric drill and the short extension is fitted into one of the holes found in an electrical junction box. The invention is used to pull in a string coming into the box through the conduit: the other end of the string, at the other end of the conduit, is tied to the wire which is to be pulled through the conduit. The dirll is turned to pull in the string, thus dragging the wire through the conduit. The washer keeps the string from jumping into the extension and jamming. The rod may be of various lengths between 6 and 14 inches.

16 Claims, 1 Drawing Sheet

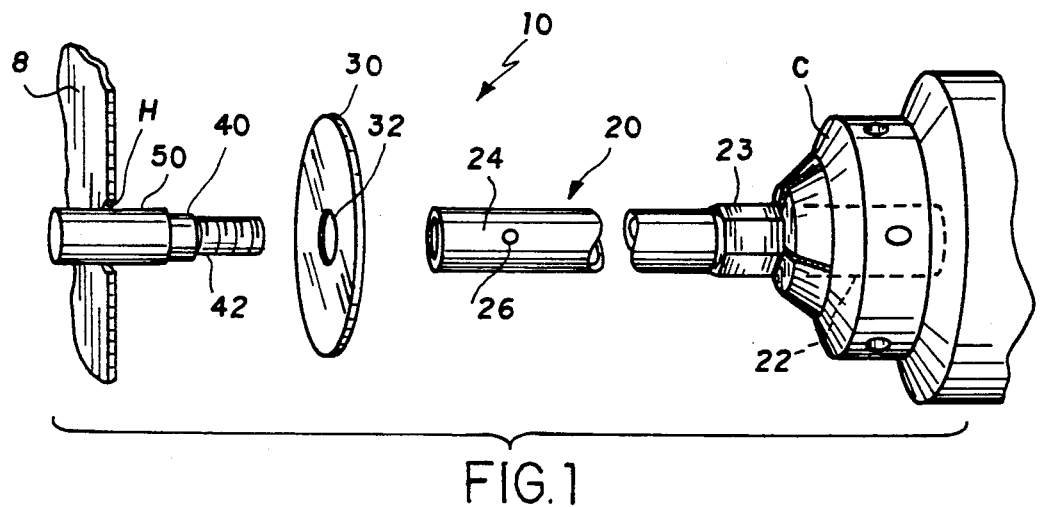
FIG. 1
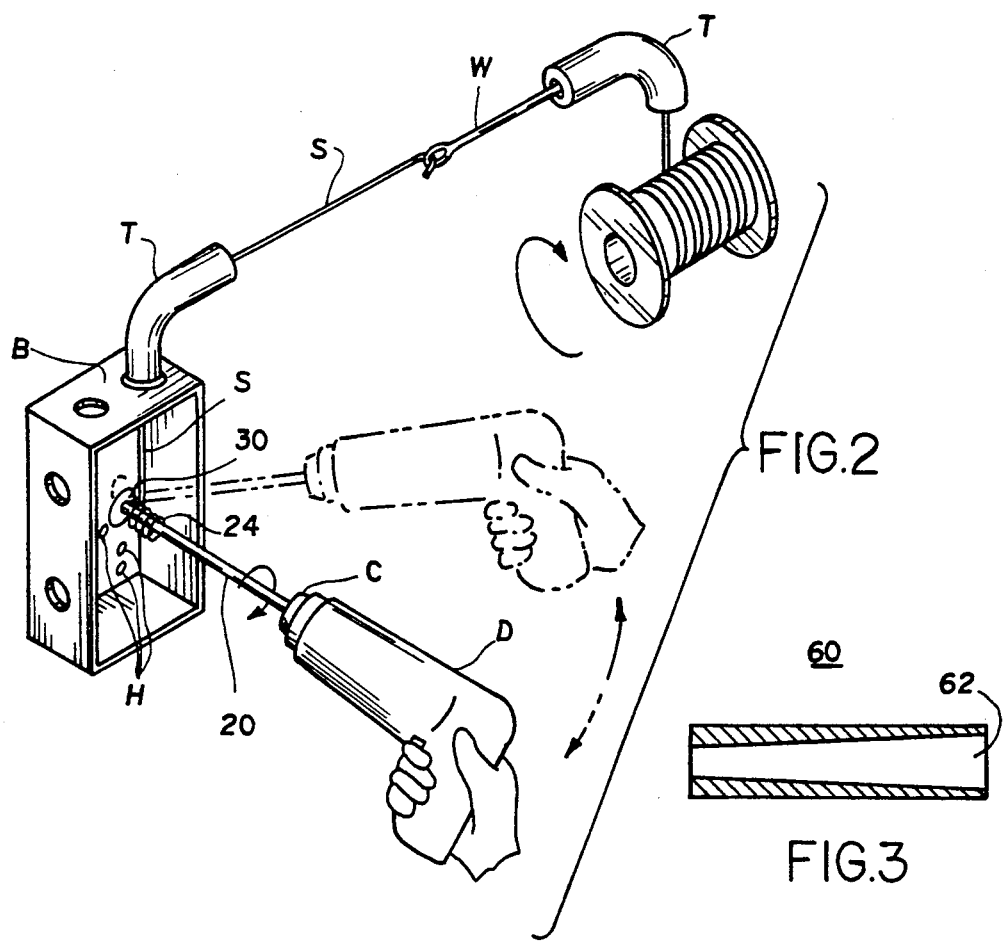
FIG. 2
FIG. 3

WIRE PULLER FOR ELECTRICAL CONDUITS

FIELD OF THE INVENTION

The present invention relates to wire or cable pullers for threading wires through electrical conduits, especially pullers used with an electric drill.

DESCRIPTION OF THE PRIOR ART

In electrical wiring work, it is often necessary to thread wires through conduits. Metal conduit is cut and bent to fit and is connected to metallic electrical junction boxes. The conduits and boxes are grounded, and the wires or cables that carry current are fed through the conduits from one box to another.

To feed wires through a conduit, a string is first run through the conduit tube by using a vacuum pump and a "mouse". A mouse is a cylindrical styrofoam plug, slightly smaller than the inner diameter of the conduit, which has means for attaching the string to it. Vacuum is applied to the end of the conduit tube where the string is to come out, and air pressure pulls the mouse plug through, carrying the string along with it.

The prior art method of feeding the wire through the conduit involves tying the wire to the string and pulling the other end of the string through the conduit into the junction box. This is difficult and troublesome because the worker must often assume an awkward posture, and because the string tends to cut into the worker's fingers. Often much force is required, and then the work can be painful even with gloves. In this case the string may be attached to a thicker twine, which is pulled through the conduit and which, in turn, is then used to pull through the wire. The thick twine is more comfortable to pull and allows the exertion of greater force. In extreme cases, the twine may be used to pull through a rope. (The original string is strong enough to pull through all wires. The thicker lines are used for traction.)

It is of course time consuming to repeatedly thread the various cords through the conduit. It is also expensive, not only because of the lost time but also because extra lines must be provided, stored, gathered and periodically cleaned or replaced.

Even with the use of thicker twines and ropes, the pulling is still difficult. The conduit typically runs perpendicularly into the top, bottom or side of an electrical junction box. The worker's hands are too small to fit within the box for pulling the cord straight out of the conduit, so the worker must pull on the cord with his or her hands outside of the box. As a result, the cord is bent over the lip of the conduit as it emerges, creating extra friction and wear.

A further problem involves the storage of the string as it emerges. The string will pile up on the floor as it is pulled out of the junction box, causing a minor hazard and requiring that it be cleaned up. Since the string will usually become tangled, it difficult to rewind onto a spool, so the string is in most cases simply thrown away, which is expensive and wasteful. If rope is used, it will be too expensive to discard, so it will have to be laboriously unkinked and rewound.

One solution to the last problem is to rewind the string. One such rewinder is shown in U.S. Pat. No. 4,196,864 issued to F. W. Cole. Cole shows a tapered spool for rewinding fishing line. The spool drum is shaped as the frustum of a cone. The drum is capped by end plates to keep the line on the drum while it is rotated to wrap the line. The plate at the narrow end is removable so that the wound-up fish line will readily slide off the drum. An axial shank extends from the larger diameter, fixed-cap-plate end of the spool so that the spool can be inserted into the chuck of an electric drill to power the rewinding.

Another rewinding device is shown in U.S. Pat. No. 4,951,890 issued to Terry Sossamon. This invention is basically a bottle cap with a shank for rotationally joining an electric drill to a plastic beverage bottle. Fishing line is wound about the bottle and it is spun by the drill. The large diameter of the bottle results in fast windup.

These devices both require the electrician to carry, in addition to the commonly-available electric drill, either a bulky spool or a bulky used bottle: few people would bother either to obtain or carry these items.

The other major problem of the prior art, pulling the wire-carrying string through the conduit, is not helped at all by these devices, but the prior art shows a pulling machine for electrical work, in U.S. Pat. No. 4,270,734 issued to Larry Straight.

Straight's portable wire puller device consists of a frame holding a motor and a winch. The winch drum has a line wrapped about it. The motor may be plugged into an electrical outlet and switched on to rotate the drum and pull in the line. Because the drum has a large diameter, a belt drive is needed between the drum and motor for gearing down.

The Straight device is adapted to be mounted above an electrical junction box between two wall studs. Means are provided for holding the frame in place adjacent the junction box. In use, the winch line is paid out and simultaneously fed through the conduit. Upon reaching the other end of the conduit, the wire or cable which is to be fed through the conduit is attached to the line end, and the winch is then powered to pull the line and cable through.

This puller eliminates hand pulling, so that larger diameter twines and ropes need not be used. However, the device has numerous drawbacks.

First, it is a large, bulky, and expensive piece of gear to be purchased and maintained by the electrician, which must be brought along on each job and carried to various places on the job site.

Second, it does not pull the line from inside the junction box, so that the problem of friction against the side of conduit end is unresolved. The chafing of the line against the edge of the conduit or the box edge will quickly wear the line.

Third, the specialized means of attachment, to studs alongside junctions boxes, means that the use of the puller is very restricted. If the box is mounted in any position not contemplated by the inventor, such as on the outside of a wall instead of the inside, it will not work. It will not fit into small work spaces.

Fourth, the feeding of the line from a geared-down winch will slow the operation of "fishing" the line through the conduit for attaching to the wire or cable.

The prior art does not show a puller which rewinds the guide string, which pulls the string straight from the end of the conduit, which requires no heavy auxiliary cords or lines, and which is inexpensive, portable, and easy to use.

None of the above inventions and patents, taken either singly or in combination, is seen to describe the instant invention as claimed.

Accordingly, one object of the present invention is a string puller for electrical work which is usable in tight spaces.

Another object of the present invention is a string puller for electrical work which rewinds the guide string automatically without requiring a separate rewinding operation or extra equipment.

Still another object of the present invention is a string puller for electrical work which pulls the string straight from the end of the conduit and avoids the inefficiency of friction and chafing of the string.

A further object of the present invention is a string puller for electrical work which requires no heavy auxiliary cords or lines.

A final object of the present invention is a string puller for electrical work which is inexpensive, simple, light in weight, easily maintained, easy to use, and which can be carried in a pocket.

These and other objects of the present invention will become readily apparent upon further review of the following specification and drawings.

SUMMARY OF THE INVENTION

The present invention is a compact tool for pulling string from an electrical conduit into a junction box, so that a wire or cable attached to an opposite end of the string can be dragged through the conduit to the junction box.

The tool comprises a cylindrical rod made of a strong material such as steel. The rod has two sections. The longer portion, or shank, is between 6 and 14 inches long and is ⅜ inch in diameter; this diameter is large enough to be rigid but small enough to fit into the chuck of any electric drill of moderate horsepower. The shorter portion, or pin, is ¼ inch in diameter and about ½ inch long. The pin diameter allows it to fit into the preexisting holes found in the walls of electrical junction boxes.

The shank and pin portions of the rod are coaxial. The pin is joined to one end of the shank by a short cylindrical neck, which is also coaxial with the pin and the shank. The neck diameter is slightly less than the pin diameter.

Located between the pin and the shank, surrounding the neck, is a washer. The washer has an outer diameter of 1 and ½ to 1 and ¾ inches, and a central hole whose diameter is slightly greater than the neck diameter but smaller than the pin diameter. The washer is thus free to spin around on the neck, but cannot escape from it by sliding over the pin.

In use, the rod is chucked into the jaws of an electric drill. Once the string is "fished" through the conduit with a mouse and vacuum pump, the end of the string within the junction box end is inserted through the cross hole of the shank. The pin is then inserted into one of the preexisting holes in the wall of the junction box. The box hole selected should be generally in line with the axis of the conduit tube as it enters the box. With the other end of the string secured to the wire which is to be pulled through the conduit, the drill is powered and the string wraps about the shank, pulling the wire through the conduit.

Because of the small diameter of the shank, the drill can exert a large force on the string even though its torque is moderate.

The washer is to prevent the string, during winding, from jumping from the shank to the pin and thereby jamming the rewinding operation. The washer may also be fixed solidly to the shank to constitute a flange.

The shank includes a small-diameter cross hol drilled through the shank, perpendicular to its length, for threading the end of the string to be pulled, which is wrapped about the shank.

The string is automatically rewound on the shank during the pulling operation.

BRIEF DESCRIPTION OF THE DRAWINGS

FIG. 1 is an exploded perspective view of the present invention. The chuck of an electric drill and a cutaway portion of a metal junction box wall are also shown.

FIG. 2 is a perspective view of the invention in use in a junction box, showing a conduit and wire spool.

FIG. 3 is a cross sectional view of a spin handle for unrolling string from the puller.

Similar reference characters denote corresponding features consistently throughout the attached drawings.

DETAILED DESCRIPTION OF THE PREFERRED EMBODIMENTS

The present invention, a string puller 10, is shown exploded in FIG. 1. The puller 10 is an elongate, cylindrically symmetrical object having three main parts on a common axis: a shank 20, and washer 30 and a pin 50. These parts may be made either as a solid unit or as separable parts. The washer 30 is preferably rotatable about the shank 20.

The shank 20 is a rod of steel or other strong material. Its diameter is preferably ⅜ of an inch, and its length is in the range of 6 to 14 inches. The ⅜ inch diameter is suitable for fitting into the rotatable chuck of the sort of heavy hand-held electric drill commonly used in electrical and construction work. A chuck C is shown in the figure. Most commercially-used drills have chucks which can accept cylindrical rods up to a maximum of either ⅜ or ½ inch. (½-inch drills are also exist, but these are generally light-duty drills not used by professional electricians.)

By making the diameter of the shank 20 the largest that will fit into common drills, the strength of the shank 20 and the grip of the drill chuck C on the shank 20 is maximized. However, other shank diameters could also be used, such as a ¼ inch for use with lighter-duty drills.

The chuck-inserted end, or chuck end, of the shank 20 is labeled 22. The chuck portion 23 of the shank, adjacent to this end 22, may be either round or hexagonal, as shown in FIG. 1. A hexagonal cross section of the chuck portion 23 allows a better grip by the chuck, which usually has three converging jaws. Other polygonal shapes are also feasible for the chuck portion 23.

The opposite end 24 is the spooling end, where string exiting from a conduit will be wound by the rotation of the spool 20 in the chuck C. At the spooling end 24 the diameter may optionally be increased or decreased from the diameter of the chuck end 22. A smaller diameter will result in slower, but more forceful pulling on a string wrapped about the shank 20; a larger diameter will yield faster but less forceful pulling.

A cross hole 26 is bored through the spooling end 24 of the shank 20 for a string to be passed through. (String is not shown in FIG. 1; it is shown in FIG. 2.) This helps to keep the string on the shank 20 when the string pulling is first started. The cross hole 26 is optional: if it is omitted, the string when wrapped about the shank a few times by hand will be held tight by friction.

The washer 30 is located at the spooling end 24. It is thick enough for adequate strength, and has an outside diameter between 1 and ½ and 1 and ¾ inches. While the washer 30 may be fixed to the shank 20 (acting as a flange), it is preferably held loosely in place for rotation relative to the shank 20. This prevents the washer 30 from rubbing hard against the inside surface of the junction box. In this preferred embodiment, the shank 20 rides on a neck 40 which joins the shank 20 to the pin 50. This embodiment is described below. The construction is shown in FIG. 1.

The neck 40 has a diameter which is smaller than the diameters of both the shank 20 and of the pin 50. The washer 30 includes a central hole 32 which has a diameter which is greater than the neck 40 diameter but smaller than either the shank spooling end 24 diameter or the pin 50 diameter. The washer 30 is thus held between the pin 50 and the shank 20. The neck 40 length is made slightly greater than the washer 30 thickness. The washer is held loosely, and can rotate relative to the shank 20.

As discussed further below, the pin 50 has a preferred diameter of ¼ inch. This means that the neck will have a diameter of around 3/16 inch, and the hole 32 in the washer 30 will have a diameter of perhaps 7/32 inch.

The pin 50 is rigidly fixed to the shank 20. The pin 50 therefore is made removable. Numerous ways of doing this are available; one particular method is shown in drawing FIG. 1.

In this design the spooling end 24 is drilled and tapped. The pin 50 and the neck 40 are made as a unit. The neck 40 includes a threaded section 42 to engage the tapped spooling end 24. The neck section 42 is inserted through the washer hole 32 and is then screwed into the spooling end 24. The threads may be held fast with anaerobic adhesive (for example, LOCTITE) or other means. The washer 30 is in contact with the smooth untapped section of the neck 40 for easy rotation.

More sophisticated bearings for the washer 30, such as ball bearings, are within the scope of the present invention.

The pin 50 is preferably about ½ long and ¼ inch in diameter. This diameter is preferred because of the way the invention is used. (The invention is shown in use in FIG. 2.)

The pin 50 is inserted into one of the preexisting holes H in an electrical junction box B. The holes H are universally sized to accept a ¼ inch bolt or screw. The ¼ inch pin is thus adapted to fit into the box hole H easily, but without excessive play. The box hole H can then serve as a bearing for the pin 50.

The pin 50 is inserted into one of the holes H in the junction box B which is roughly in line with the axis of the conduit tube T. The puller 10 is then in proper position to pull a string S into the box B from a conduit tube T. (If there is no hole conveniently located, a ¼ inch hole is easily drilled in the right position through the wall of the box B.) The string S is inserted through the cross hole 26 if desired, and then the puller 10 may be turned to begin the wrapping of the string S around the shank spooling end 24. The puller 10 is rotated by a drill D whose spooling end 24. The puller 10 is rotated by a drill D whose chuck C grips the chuck end 22 of the shank 20. As the string S wraps about the shank 20 it is pulled in, dragging a wire W (which is tied to the other end of the string S) through the conduit tube T into the box B.

The string S will tend to clump up in one spot on the shank 20. To prevent this the angle of the shank 20 can be varied while the string S is being drawn in by the drill D. A slight downward angle of the shank 20 will send the turns into the box; an upward slope will send them back out toward the drill D. The wrap can be made fairly even by manipulating the drill D.

Once the end of the cable or wire W is in the junction box B, the string S is untied. The string S can now be unwound from the shank 20 of the puller 10. The string S can be unwound directly into the next conduit from the puller 10, or, the string can be wrapped onto a storage spool (not shown) for later use.

If the string S is rewound a spin handle 60, shown in FIG. 3, will be useful. The spin handle 60 is merely a generally cylindrical object with an axial hole into which the chuck end 22 of the shank 20 can be placed for free turning. The spin handle, as shown, is preferably cylindrical with a tapered hole 62. The taper is such that the shank 20 will stop partway down. The string may be pulled off the shank 20 while the chuck end 22 is held in the spin handle 60.

The length of the shank 20 may vary, as stated above, from 6 to 14 inches. The longer shank is useful when the box B is deep or recessed, or if there are obstructions; the shorter shank is useful in tight spaces. Because different lengths are useful in different situations, a kit consisting of three or four pullers having various lengths, along with a spin handle, would be useful for electrical workers.

The puller 10, or pullers of a set, will advantageously be marketed with a string already wrapped about the spooling end 24. The puller 10 will then be ready to use as a spool for unwinding the string, and no separate purchase of a string will be needed.

The present invention is seen to be a great improvement over the prior art, in that an electrician can pull wires through conduits with only a small, light, foolproof and rugged tool. The invention obviates extra larger-diameter ropes, heavy gloves for hauling, muscle strain, and the wear, tear, and waste of string.

In general, it is to be understood that the present invention is not limited to the sole embodiment described above, but encompasses any and all embodiments within the scope of the following claims. In particular, the term "drill" as used in the following claims is meant to include any device for generating torque or rotational powered motion (whether powered by hand, by electricity, or by anything else); and "chuck" as used in the following claims means any gripping means attached to a drill which can grasp an elongated object such as the shank of the present invention to impart rotation to the object.

I claim:

1. A string puller for use with a drill having a chuck for pulling a string into a junction box from a hollow conduit connected thereto, said box having walls including wall holes therethrough, the wall holes having a wall hole diameter;

said puller comprising a rigid body having cylindrical symmetry about an axis and including:
    a chuck end,
    a pin end,
    an elongated chuck portion adjacent said chuck end,
    a pin adjacent said pin end, said pin having a pin diameter smaller than the wall hole diameter;
    a round flange disposed on said body between said chuck portion and said pin;

a spooling portion having a constant spooling diameter, said spooling portion disposed between said chuck portion and said flange;

a cross hole through said spooling portion for inserting the string therethrough, said cross hole generally at right angles to said axis; and said flange diameter being greater than said chuck diameter; whereby said chuck portion may be clamped in the chuck, said pin may be inserted into one of the wall holes in the box, an end of the string may be wrapped about said body adjacent said flange, and said body may be rotated by the drill for drawing the string into the box from the conduit, with the string prevented from wrapping about said pin by said flange.

2. The puller according to claim 1 wherein
said chuck portion is cylindrical and has a constant chuck diameter near said chuck end for grasping by the chuck, and
said pin is cylindrical and said pin diameter is constant.

3. The puller according to claim 2 wherein
said chuck diameter is ⅜ of an inch, and
said pin diameter is ¼ of an inch.

4. The puller according to claim 3 wherein
said flange diameter is between 1 and ½ inches and 1 and ¾ inches.

5. The puller according to claim 1 wherein
the string is wound about said spooling portion for convenience in unwinding.

6. The puller according to claim 1 wherein
said chuck portion is polygonal in cross section for grasping by the chuck.

7. A set comprising a spin handle and a plurality of the puller according to claim 1, including pullers having chuck portions, said chuck portions having various respective chuck portion lengths, whereby
various of said pullers are adapted to various respective tasks.

8. A string puller for use with a drill having a chuck for pulling a string into a junction box from a hollow conduit connected thereto, said box having walls including wall holes therethrough, the wall holes having a wall hole diameter;

said puller comprising:

a rigid body having cylindrical symmetry about an axis and including a chuck end, a pin end, an elongated chuck portion adjacent said chuck end, a pin adjacent said pin end, said pin having a pin diameter smaller than the wall hole diameter, and a neck having a neck diameter and a neck length, said neck disposed between said chuck portion and said pin; and a washer having an outer washer diameter and a central washer hole, said washer hole having a washer hole diameter greater than said neck diameter, less than said shank diameter, and less than said pin diameter, said washer having a thickness less than said neck length; whereby said washer is free to rotate about said neck and is held from sliding from said neck over said shank or said pin, said chuck portion may be clamped in the chuck, said pin may be inserted into one of the wall holes in the box, an end of the string may be wrapped about said body adjacent said flange, and said body may be rotated by the drill for drawing the string into the box from the conduit, with the string prevented from wrapping about said pin by said washer.

9. The puller according to claim 8 wherein
said chuck portion is cylindrical and has a constant chuck diameter near said chuck end for grasping by the chuck, and
said pin is cylindrical and said pin diameter is constant.

10. The puller according to claim 9 wherein
said chuck diameter is ⅜ of an inch, and
said pin diameter is ¼ of an inch.

11. The puller according to claim 10 wherein
said outer washer diameter is between 1 and ½ inches and 1 and ¾ inches.

12. The puller according to claim 8 including
a spooling portion having a constant spooling diameter, said spooling portion disposed between said chuck portion and said neck.

13. The puller according to claim 12 including
a cross hole through said spooling portion for inserting the string therethrough, said cross hole generally at right angles to said axis.

14. The puller according to claim 12 wherein the string is wound about said spooling portion for convenience in unwinding.

15. The puller according to claim 8 wherein
said chuck portion is polygonal in cross section for grasping by the chuck.

16. A set comprising a spin handle and a plurality of the puller according to claim 8, including pullers having chuck portions, said chuck portions having various respective chuck portion lengths, whereby
various of said pullers are adapted to various respective tasks.

* * * * *